United States Patent
Ide et al.

(10) Patent No.: US 6,855,414 B2
(45) Date of Patent: Feb. 15, 2005

(54) MAGNETIC RECORDING MEDIUM

(75) Inventors: Tsutomu Ide, Tokyo (JP); Katsuhiko Yamazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/629,766

(22) Filed: Jul. 30, 2003

(65) Prior Publication Data

US 2004/0072033 A1 Apr. 15, 2004

(30) Foreign Application Priority Data

Jul. 30, 2002 (JP) ...................................... 2002-220802

(51) Int. Cl.$^7$ .............................................. G11B 5/735
(52) U.S. Cl. ................................. 428/329; 428/694 BB
(58) Field of Search ........................... 428/329, 694 BB

(56) References Cited

U.S. PATENT DOCUMENTS

| | | | | |
|---|---|---|---|---|
| 4,404,238 A | * | 9/1983 | Baldwin | ..................... 427/128 |
| 4,451,532 A | * | 5/1984 | DePalma et al. | ........... 428/336 |
| 5,958,565 A | * | 9/1999 | Hattori et al. | .............. 428/212 |
| 6,228,461 B1 | | 5/2001 | Sueki et al. | |
| 6,251,509 B1 | | 6/2001 | Kawamata et al. | |

FOREIGN PATENT DOCUMENTS

| | | |
|---|---|---|
| EP | 1 049 076 | 11/2000 |
| JP | 10-312530 | 11/1998 |
| JP | 11-86267 | 3/1999 |

* cited by examiner

Primary Examiner—Stevan A. Resan
(74) Attorney, Agent, or Firm—Oblon, Spivak, McClelland, Maier & Neustadt, P.C.

(57) ABSTRACT

A magnetic recording medium comprises a back coat layer containing carbon black and alumina as non-magnetic powder. The relationship between the abrasivity (y) in microns of the back coat layer and the alumina content (x) parts by weight to 100 parts by weight of non-magnetic powder excluding alumina satisfies four equations $y \leq 4.6x+12.2$, $y \geq 4.1x+10.8$, $y \geq 13$, $y \leq 17$. The abrasivity is measured such that an edge of a prismatic Sendust bar is pushed perpendiculary onto the back coat layer such that the magnetic recording medium is pressed at an approaching angle of 12 degree, and the magnetic recording medium is supported by a tension of 0.526 N/cm per unit width and a 50-m length thereof is moved back and forth one time over the Sendust bar at a running speed of 0.3 m/s.

1 Claim, 4 Drawing Sheets

MAGNETIC RECORDING MEDIUM

BACKGROUND OF THE INVENTION

1. Field of the Invention

The present invention relates to a magnetic recording medium having a back coat layer. More particularly, the present invention relates to a magnetic recording medium having a back coat layer with excellent durability such that a magnetic layer is not damaged when the magnetic layer is rubbed against the back coat layer.

2. Description of the Related Art

In a magnetic recording medium for use in a video tape or a computer storage device, information is recorded and read via a magnetic head. A tape-type magnetic recording medium run while being in contact with a magnetic head as well as a guide pin, a guide roll, a capstan, a pinch roller and the like in a running path, and therefore, the magnetic layer or back coat layer is easily abraded. In particular, one reason for using the back coat layer is to provide running stability. In a running path of the magnetic recording medium, the back coat layer is often disposed in contact with the guide pins and the like. When the magnetic recording medium is run for a long time, durability of the back coat layer in contact with the guide pins and the like is critical.

It is generally known that inorganic pigment such as alumina having a high Moh's hardness is contained in the back coat layer in order to improve the durability of the back coat layer. For example, Japanese Unexamined Patent Application Publication No. 10-312530 describes a magnetic recording medium comprising a back coat layer containing inorganic powder having a Moh's hardness of 7 or more; 95% or more by number of the inorganic powder having an average particle size within the range of 0.12 to 0.70 $\mu$m. Japanese Unexamined Patent Application Publication No. 11-86267 describes a magnetic recording medium comprising a plurality of back coat layers wherein a back coat layer other than the outermost back coat layer, i.e., a middle back coat layer, contains inorganic powder as an abrasive having a Moh's hardness of 5 or more, and being smaller than the film thickness of the middle back coat layer, and the outermost back coat layer substantially contains no inorganic powder having a Moh's hardness of 5 or more.

In recent years, in magnetic recording media for use in computer storage devices, thinner and smoother magnetic layer is needed for electromagnetic conversion properties and improvements in error production as the recording density becomes high. Also, more durable magnetic recording media are needed for increasing the reliability of storage devices.

When alumina is contained in the back coat layer, durability of the back coat layer is improved, but the abrasivity (ability of the back coat layer to scrape an object when the back coat layer is rubbed against the object) becomes high. The magnetic recording medium is wound in a roll within a cartridge, taken out from the cartridge for recording and reading, passed through a running path within the recording device, and again wound in a roll within the device or the cartridge. It has been found that the magnetic layer is scraped by the back coat layer, and the thin, smooth magnetic layer may be scraped by the back coat layer when the magnetic recording medium is wound in a roll many times and the back coat layer has high abrasivity. Such scrapes may cause errors, and fragments of the magnetic layer produced by scrapes may cause clogging in the magnetic head, or may be deposited on the guide pins and the like, resulting in unstable running.

SUMMARY OF THE INVENTION

Accordingly, it is an object of the present invention to provide a magnetic recording medium comprising a back coat layer containing alumina for improving durability but having low abrasivity.

A magnetic recording medium of the present invention comprises a non-magnetic substrate, a non-magnetic layer disposed on one surface of the non-magnetic substrate, a magnetic layer disposed on the non-magnetic layer, and a back coat layer disposed on the other surface of the non-magnetic substrate.

The back coat layer contains at least carbon black and alumina as non-magnetic powder, and the relationship between the abrasivity (y) in microns of the back coat layer and the alumina content (x) parts by weight to 100 parts by weight of non-magnetic powder excluding alumina satisfies the following four equations:

$$y \leq 4.6x+12.2 \tag{1}$$

$$y \geq 4.1x+10.8 \tag{2}$$

$$y \geq 13 \tag{3}$$

$$y \leq 17 \tag{4}$$

The abrasivity is measured as follows: an edge of a prismatic Sendust bar having a square cross-section is pushed onto the surface of the back coat layer perpendiculary to the running direction of the magnetic recording medium, so that the longitudinal direction of the Sendust bar is orthogonal to the running direction of the magnetic recording medium, whereby the magnetic recording medium is pressed at an approaching angle of 12 degree; the magnetic recording medium is supported by a tension of 0.526 N/cm per unit width and a 50-m length thereof is moved back and forth one time over the Sendust bar at a running speed of 0.3 m/s, whereby the width of the region scraped in the running direction on the Sendust bar by the surface of the back coat layer represents the abrasivity.

The alumina contained in the back coat layer preferably has an average particle diameter of 0.15 to 0.23 $\mu$m.

With the above-described construction, the abrasivity of the back coat layer can be reduced when alumina is contained in the back coat layer to improve durability.

Alumina having a high Moh's hardness is contained in the back coat layer in order to reinforce a coated film by introducing powder having a large average particle size into the back coat layer, and to improve abrasion resistance by the alumina exposed on the surface. Although the abrasive having a higher Moh's hardness exposed on the surface can improve the abrasion resistance, the abrasivity of the back coat layer can also be increased. When the magnetic layer is contacted with the back coat layer, the magnetic layer may be scraped.

When the alumina content is decreased in order not to damage the magnetic layer, the abrasivity of the back coat layer is decreased, but the reinforcement and the abrasion resistance are also undesirably decreased. When the alumina has a reduced average particle size, the alumina is buried in other inorganic powder or a binder resin, and is insufficiently exposed on the surface, whereby the abrasivity will be reduced. However, the reinforcement by the alumina in the back coat layer is lowered, resulting in insufficient durability.

According to the present invention, the abrasivity of the back coat layer is reduced to prevent the magnetic layer from being damaged, while alumina is contained in the back coat layer to improve durability of the back coat layer. In the present method, alumina having lower abrasivity is used as compared with the conventional alumina used in the art. Thus, an undesirable increase in the abrasivity of the back coat layer can be prevented so as not to damage the magnetic layer, even if a sufficiently high alumina content is contained to provide the reinforcement and the abrasion resistance.

The abrasivity of the alumina can be evaluated by a relative abrasivity described below. Two parts by weight of alumina to be tested and 98 parts by weight of water are used to produce an alumina slurry. While a fixed amount of the alumina slurry is provided, a (111) surface of a manganese zinc ferrite single crystal is abraded on a buff to measure the abraded amount per unit time (length of the single crystal abraded). The abraded amount is compared with that of a standard sample, and a relative abrasivity is thus determined. The standard sample is "AKP20" manufactured by Sumitomo Chemical Co; Ltd; and the relative abrasivity is set to 100.

Examples of alumina having a low relative abrasivity include "TM-DR", "TM-DA", and "TM-DAR" manufactured by Taimei Chemicals Co., Ltd. It is contemplated that such aluminas have a low relative abrasivity since they include substantially spherical particles having no acute corners. The preferable alumina content is determined as follows: the relationship between the abrasivity (y) in microns of the back coat layer and the alumina content (x) parts by weight to 100 parts by weight of non-magnetic powder excluding alumina satisfies the following four equations shown by the shaded region in FIG. 1:

$$y \leq 4.6x+12.2 \quad (1)$$

$$y \geq 4.1x+10.8 \quad (2)$$

$$y \geq 13 \quad (3)$$

$$y \leq 17 \quad (4)$$

The abrasivity is measured as follows:

an edge of a prismatic Sendust bar having a square cross-section is pushed onto a surface of the back coat layer perpendicularly to the running direction of the magnetic recording medium, so that the longitudinal direction of the Sendust bar is orthogonal to the running direction of the magnetic recording medium, whereby the magnetic recording medium is pressed at an approaching angle of 12 degree; the magnetic recording medium is supported by a tension of 0.526 N/cm per unit width and a 50-m length thereof is moved back and forth one time over the Sendust bar at a running speed of 0.3 m/s, whereby the width of the region scraped in the running direction on the Sendust bar by the surface of the back coat layer represents the abrasivity.

"TM-DR" having a large average particle size of 0.23 μm, manufactured by Taimei Chemicals Co., Ltd., can provide the reinforcement and the abrasion resistance of the back coat layer, even if the content thereof is 0.2 parts by weight, which is the minimum value of (x) within the above-defined range. If the content is less than the minimum value, sufficient reinforcement and abrasion resistance cannot be provided. If the content exceeds 1.0 parts by weight, the abrasivity of the back coat layer becomes too high, whereby the magnetic layer may be damaged. The relationship between the content of "TM-DR" and the abrasivity of the back coat layer is represented by the above equation (1). In the case of using "TM-DAR" having a small average particle size of 0.15 μm, a higher content than that of "TM-DR", i.e., 0.55 parts by weight or more thereof is required in order to provide sufficient reinforcement and abrasion resistance. However, if the content exceeds 1.45 parts by weight, the abrasivity of the back coat layer becomes too high, whereby the magnetic layer may be damaged. The relationship between the content of "TM-DAR" and the abrasivity of the back coat layer is represented by the above equation (2).

As the average particle size of the alumina becomes smaller than 0.23 μm, the equation relating to (x) and (y) changes from equation (1) to equation (2). Accordingly, the relationship between the content (x) of "TM-DA" having a medium average particle size between those of "TM-DR" and "TM-DAR", and the abrasivity (y) of the back coat layer are drawn between equations (1) and (2) with xy orthogonal coordinates.

Alumina having a higher average particle size than "TM-DR" and a low relative abrasivity is not presently available. It is considered that alumina having a higher average particle size may have a high relative abrasivity, and the abrasivity becomes too high, when a sufficient amount thereof is contained for the reinforcement. Alumina having a lower average particle size than "TM-DAR" and a low relative abrasivity is not presently available. It is considered that alumina having a lower average particle size provides insufficient reinforcement, and it is difficult to provide sufficient durability. Accordingly, the alumina having a low relative abrasivity preferably has an average particle size of 0.15 to 0.23 μm.

If the alumina has an average particle size of 0.15 to 0.23 μm but has a high relative abrasivity, the alumina content cannot be represented by the above equations. In this case, the alumina content is such that sufficient reinforcement and abrasion resistance are provided, resulting in a damaged magnetic layer. If the average particle size is less than 0.15 μm, sufficient reinforcement and abrasion resistance cannot be provided.

The average particle size of the alumina is determined by measuring and averaging the sizes of 100 spherical alumina particles using a scanning electron microscope (SEM) at 20000 magnification.

The abrasivity of the back coat layer is measured in accordance with BCMA-288 Annex H: Tape abrasivity measurement procedure, which is a method of measuring the abrasivity of a magnetic layer. This method is for a standard magnetic tape cartridge for information exchange, which is one of storage device system for a computer, and having a width of 3.81 mm, in a helical scanning recording, DDS-4 mode, and a tape length of 150 m.

As shown in FIG. 2, the longitudinal direction of a prismatic Sendust bar 2 having a square cross-section is orthogonal to the running direction of the above-mentioned magnetic recording medium 1. Then, an edge of the Sendust bar 2 is pushed perpendicularly onto a surface of a back coat layer in the running direction of the magnetic recording medium 1 so that the magnetic recording medium 1 is pressed at an approaching angle θ of 12 degree. Then, a 50-m length of the magnetic recording medium 1, supported by a tension of 0.526 N/cm per unit width, is moved back and forth at a running speed of 0.3 m/s. The Sendust bar 2 used is a prismatic Sendust bar (Fe—Si—Al alloy) having a square cross-section with a size of 6.0×6.0×25.0 mm, trade name "Block" made of SD-5 manufactured by Tokin Corp. The measurement is made under a relative humidity of 50±10% and a temperature of 25±3° C.

As shown in FIG. 3, the edge of the Sendust bar 2 is scraped by contact with the magnetic recording medium. A width (y) (μm) of a surface formed by scraping in the running direction represents the abrasivity of the back coat layer.

When the back coat layer has an abrasivity of less than 13 µm, the back coat layer may be scraped by contact with guide pins and the like upon running. The scrapes may increase the friction of the back coat layer, and the running may become unstable, which causes errors. Fragments of the magnetic layer produced by scrapes may cause clogging in the magnetic head, or may be deposited on the guide pins and the like, resulting in unstable running. 13 µm or more of the abrasivity of the back coat layer is represented by the above equation (3).

When the back coat layer has an abrasivity exceeding 17 µm, the magnetic recording medium is wound in a roll many times within the cartridge or the device. When the magnetic layer is contacted with the back coat layer, the magnetic layer may be damaged, which causes errors. Fragments of the magnetic layer produced by scrapes may cause clogging in the magnetic head, or may be deposited on the guide pins and the like, resulting in unstable running. 17 µm or less of the abrasivity of the back coat layer is represented by the above equation (4). The equation (4) is preferably:

$$y \leq 16 \tag{4a}$$

more preferably:

$$y \leq 15 \tag{4b}$$

The back coat layer having properties defined by the above equations (1) to (4) has excellent durability as well as low abrasivity. Accordingly, the magnetic layer is not damaged when it is contacted with the back coat layer.

According to the magnetic recording medium of the present invention, alumina is contained in the back coat layer to improve the durability of the back coat layer, and the abrasivity of the back coat layer is reduced to prevent the magnetic layer from being damaged when the magnetic layer is contacted with the back coat layer.

DESCRIPTION OF THE PREFERRED EMBODIMENTS

Figure 1:
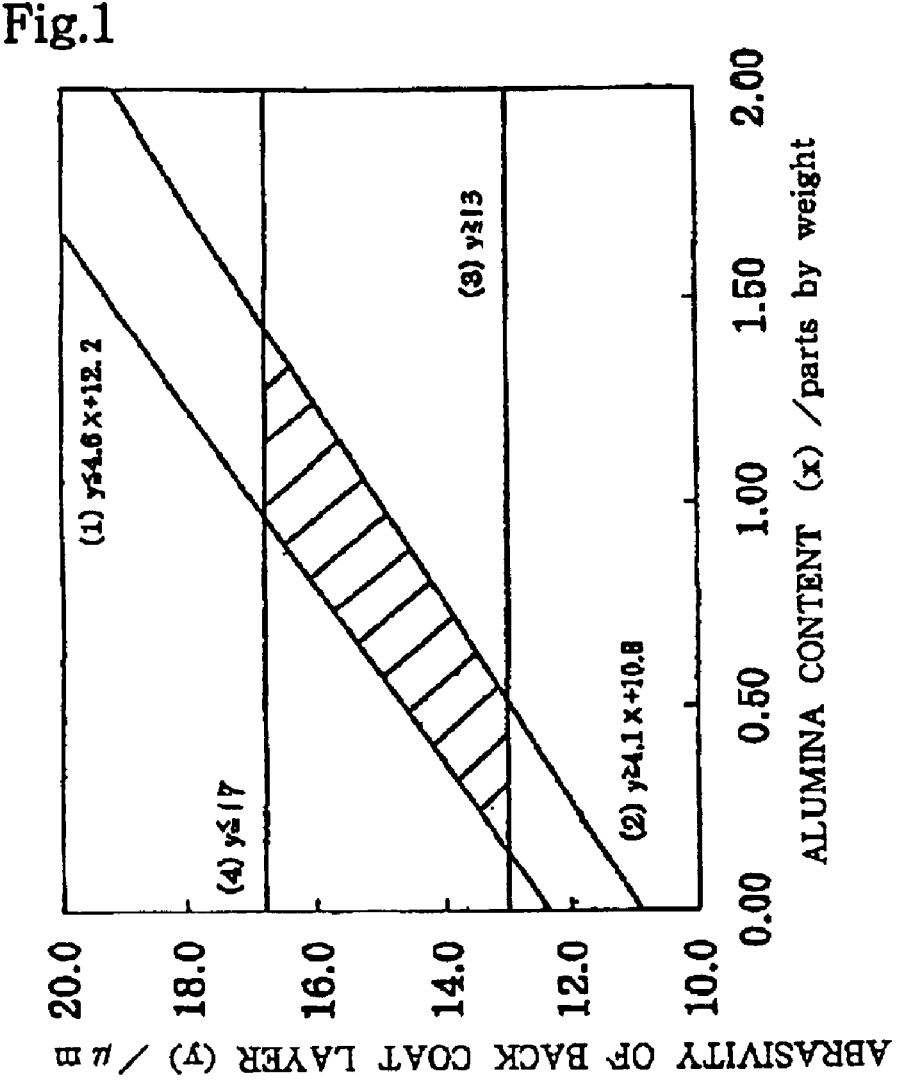
FIG. 1 is a graph of the equations (1) to (4) showing the relationship between the alumina content (x) and the abrasivity (y) of the back coat layer.

Objects and advantages of the invention are further illustrated by the following examples, but the particular materials, constructions and coating methods recited in these examples should not be construed to unduly limit this invention as long as the alumina content and the abrasivity of the back coat layer are within the above-mentioned ranges.

The non-magnetic substrate includes but is not limited to any known materials such as polyester and polyamide.

The back coat layer mainly comprises non-magnetic powder and a binder resin, and is disposed for improving the running stability and providing antistatic properties to the magnetic layer on one surface of the non-magnetic substrate; a non-magnetic layer and the magnetic layer are formed on the other surface of the non-magnetic substrate. Examples of the non-magnetic powder include carbon black and alumina, as well as various non-magnetic powders such as calcium carbonate, titanium oxide, barium sulfate, hematite, geothite, various other abrasives. Any known carbon black including but not limited to furnace black, thermal black, acetylene black can be used. Preferably, alumina has a low relative abrasivity as described above, in order to avoid an excessive abrasivity of the back coat layer.

Any known binders including but not limited to thermoplastic resin, thermosetting resin, and electron beam hardening resin can be used in the back coat layer. As a cross-linking agent for curing the binder resin, for example in the case of the thermosetting resin, various known polyisocyanates can be used.

Dispersants such as surfactants; lubricants such as higher fatty acids, higher fatty acid esters, and fatty acid amides; and various additives may be added to the back coat layer, as needed. A coating material for forming the back coat layer is prepared by adding organic solvents such as methylethylketone, toluene, and cyclohexanone to the above components. The organic solvents are not especially limited.

A method of producing the back coat layer comprises a blending step, a dispersing step, and a mixing step before or after these steps, as needed, as is known in the art. The back coat layer is formed by coating the coating on the non-magnetic substrate by any known coating method. It is possible to dispose an under coat layer (an easy adhesive layer) between the back coat layer and the non-magnetic substrate for improving adhesion. It is also possible to subject the non-magnetic substrate to a known non-contact surface treatment, such as corona discharge. The coating material thus-applied is generally dried and fixed by known drying means disposed within a drying furnace. After drying, calendering is conducted as a surface smoothing treatment, as needed. A heat curing treatment and/or electron beam irradiation treatment may be conducted to promote curing of the binder resin.

Preferably, the back coat layer has a thickness of 0.1 to 1.0 µm. If the thickness exceeds 1.0 µm, then the running stability is not changed, a solvent residue in the back coat layer is unfavorably increased to decrease the coating film strength, and cupping (to the degree that a section of the tape-type magnetic recording medium is smooth or arc in a width direction) of the back coat layer produces a significantly convex arc at the magnetic layer side, whereby the back coat layer is not well contacted with the magnetic head. If the thickness is less than 0.1 µm, the size is smaller than the mean primary particle size, and then alumina is entirely exposed on the surface, whereby the abrasivity of the back coat layer becomes too high.

The non-magnetic layer mainly comprises the non-magnetic powder and the binder resin, and is formed on the non-magnetic substrate. Examples of the non-magnetic powder used in the non-magnetic layer include needle-like non-magnetic powder such as hematite and geothite, and various known inorganic powders such as calcium carbonate, titanium oxide, barium sulfate, and alumina. It is preferable that carbon black be used in the non-magnetic layer. Any known carbon black such as furnace black, thermal black, and acetylene black can be used.

Any known binders including but not limited to thermoplastic resin, thermosetting resin, and electron beam hardening resin can be used in the non-magnetic layer. As a cross-linking agent for hardening the binder resin, for example in the case of the thermosetting resin, various known polyisocyanates can be used.

Abrasives; dispersants such as surfactants; lubricants such as higher fatty acids, higher fatty acid esters, and fatty acid amides; carbon black; and various additives may be added to the non-magnetic layer, as needed. A coating material for forming the non-magnetic layer is prepared by adding organic solvents such as methylethylketone, toluene, and cyclohexanone to the above components. The organic solvents are not especially limited.

A method of producing the non-magnetic layer comprises a blending step, a dispersing step, and a mixing step before or after these steps, as needed, as is known in the art. The non-magnetic layer is formed by coating the coating material on the non-magnetic substrate by any known coating method. It is possible to dispose an under coat layer (an easy adhesive layer) between the non-magnetic layer and the non-magnetic substrate for the purpose of adhesion improvement. It is also possible to subject the non-magnetic substrate to a known non-contact surface treatment, such as corona discharge. The coating material thus-applied is generally dried and fixed by known drying means disposed within a drying furnace. After drying, calendering is conducted as a surface smoothing treatment, as needed. A heat curing treatment and/or electron beam irradiation treatment may be conducted to promote curing of the binder resin.

The magnetic layer mainly comprises ferromagnetic powder and a binder resin, and is disposed on the non-magnetic layer disposed on the non-magnetic substrate. Examples of the ferromagnetic powder include but are not limited to oxide powder such as magnetite and barium ferrite, and metal powder of metals such as iron, cobalt and nickel, or an alloy thereof.

Any known binders including but not limited to thermoplastic resin, thermosetting resin, and electron beam hardening resin can be used in the magnetic layer. As a cross-linking agent for hardening the binder resin, for example in the case of the thermosetting resin, various known polyisocyanates can be used.

Abrasives; dispersants such as surfactants; lubricants such as higher fatty acids, higher fatty acid esters, and fatty acid amides; carbon black; and various additives may be added to the magnetic layer, as needed. A coating material for forming the magnetic layer is prepared by adding organic solvents such as methylethylketone, toluene, and cyclohexanone to the above components. The organic solvents are not especially limited.

A method of producing the magnetic layer comprises a blending step, a dispersing step, and a mixing step before or after these steps, as needed, as is known in the art. The magnetic layer is formed by coating the coating material on the non-magnetic layer formed on the non-magnetic substrate by any known coating method. The coating material thus-applied is generally dried and fixed by known drying means disposed within a drying furnace. The ferromagnetic powder can be oriented or non-oriented by applying a magnetic field. A lubricant coating film and various coating films for protecting the magnetic layer may be disposed on the magnetic layer, as needed. After drying, calendering is conducted as a surface smoothing treatment, as needed. A heat curing treatment and/or electron beam irradiation treatment may be conducted to promote curing of the binder resin.

The layers can be formed in any order, as long as the magnetic layer is formed on the non-magnetic layer. The heat curing treatment and/or the electron beam irradiation treatment of each layer may be conducted after the respective layers are formed, or after all layers are formed. After all layers are formed, cutting is performed to produce a magnetic recording medium. As needed, a polishing treatment or a cleaning treatment may be performed.

EXAMPLES

The following examples, as well as comparative examples, are provided to aid in understanding of the present invention and are not to be construed as limiting the scope thereof.

Example 1

(Coating Material for Non-magnetic Layer)
Needle-like hematite (α-FeOOH) 80.0 parts by weight
(major axis: 0.1 μm, crystallite diameter 12 nm)
Carbon black 20.0 parts by weight
(manufactured by Mitsubishi Chemical Corporation, #950B, average particle size: 17 nm, BET value: 250 m$^2$/g, DBP oil absorption: 70 ml/100 g, pH:8)
Vinyl chloride resin (solid) 11.0 parts by weight
(Toyobo Co., Ltd., TB-0246, vinyl chloride—epoxy containing monomer copolymer, average polymerization degree: 310, potassium persulfate used, S content: 0.6% (mass %), acrylic-modified MR110 manufactured by Nippon Zeon Co., Ltd., with 2-isocyanate ethyl methacrylate (MOI), acrylic content: 6 mol/1 mol)
Polyurethane resin (solid) 9.0 parts by weight
(Toyobo Co., Ltd., TB-0216, hydroxy containing acrylic compound—phosphonic acid group containing phosphorus compound—hydroxy containing polyester polyol, average molecular weight: 13000, P content: 0.2% (mass %), acrylic content: 8 mol/1 mol)
Dispersant 1.2 parts by weight
(manufactured by Toho Chemical Industry Co., Ltd., RE610, phenyl phosphonic acid)
Abrasive 4.0 parts by weight
(manufactured by Sumitomo Chemical Co., Ltd., HIT60A, α-alumina, average particle size: 0.22 μm)
Fatty acid 0.5 parts by weight
(manufactured by NOF corporation, NAA180)
Fatty acid amide 0.5 parts by weight
(manufactured by Kao corporation, fatty acid amide S)
Fatty acid ester 1.0 parts by weight
(manufactured by Nikko Chemicals, Co., Ltd., Nikkol BS)
solid content=30.0% (mass %)
solvent ratio: methylethylketone/toluene/cyclohexanone=2/2/1 (mass ratio)

The above-described materials excluding the fatty acid, the fatty acid amide, and the fatty acid ester were blended in a kneader and dispersed in a horizontal bottle mill having a diameter of 0.8 mm in which zirconia beads were filled up to 80% (50% by volume of voids). Finally, the fatty acid, the fatty acid amide, the fatty acid ester, and remaining solvents were added to adjust the viscosity. The mixture was filtered with a filter having an average diameter of 0.5 μm to produce a coating material for a non-magnetic layer.

(Coating Material for Magnetic Layer)
Ferromagnetic powder 100.0 parts by weight
(iron-based needle-like magnetic powder (Fe/Co/Al/Y=100/24/5/8 (atomic ratio), Hc: 189 kA/m, σs: 135 Am$^2$/kg, BET value: 51 m$^2$/g, major axis length: 0.1 μm)
Vinyl chloride resin 14.0 parts by weight
(MR110 (vinyl chloride copolymer) manufactured by Nippon Zeon Co., Ltd.)
Polyurethane resin 2.0 parts by weight (manufactured by Toyobo Co., Ltd., UR8700, polyester polyurethane)
Dispersant 3.0 parts by weight
(manufactured by Toho Chemical Industry Co., Ltd., RE610, phenyl phosphonic acid)
Abrasive 4.0 parts by weight
(manufactured by Sumitomo Chemical Co., Ltd., HIT82, α-alumina, average particle size: 0.12 μm)
Fatty acid 1.2 parts by weight
(manufactured by NOF corporation, NAA180)
Fatty acid ester 1.0 parts by weight
(manufactured by Nikko Chemicals, Co., Ltd., Nikkol BS)
solid content=16% (mass %)
solvent ratio: methylethylketone/toluene/cyclohexanone=1/1/3 (mass ratio)

The above-described materials were blended in a kneader and dispersed in a horizontal bottle mill. Finally, the viscosity was adjusted. Four parts by weight of a curing agent ("CORONATE L" manufactured by Nippon Polyurethane Industry Co., Ltd.) was added and mixed therewith, and then filtered with a filter having an average diameter of 0.5 μm to produce a coating material for a magnetic layer.

(Back Coat Composition)
Carbon black 75.0 parts by weight
("BP-800" manufactured by Cabot Corp., an average particle size of 17 nm, DBP oil absorption: 68 ml/100 g, specific surface area obtained by BET method: 210 m²/g)
Carbon black 10.0 parts by weight
("BP-130" manufactured by Cabot Corp., an average particle size of 75 nm, DBP oil absorption: 69 ml/100 g, specific surface area obtained by BET method: 25 m²/g)
Calcium carbonate 15.0 parts by weight
(manufactured by Shiraishi Kogyo Kaisha, Ltd., "Hakuenka O", an average particle size of 30 nm)
Abrasive 0.2 parts by weight based on 100 parts by weight of the above-described two types of carbon black and calcium carbonate)
(manufactured by manufactured by Taimei Chemicals Co., Ltd., α-alumina, "TM-DR", average particle size: 0.23 μm)
Nitro cellulose 65 parts by weight
(manufactured by Asahi Chemical Industry Co., Ltd., BTH 1/2)
Polyurethane resin 35.0 parts by weight
(fatty acid polyester diol/aromatic polyester diol=43/53)
solid content=11.5% (mass %)
solvent ratio: methylethylketone/toluene/cyclohexanone= 50/40/10 (mass ratio)

The above-described materials were blended in a kneader and dispersed in a horizontal bottle mill having a diameter of 0.8 mm in which zirconia beads were filled up to 80% (50% by volume of voids). Four parts by weight of a curing agent ("CORONATE L" manufactured by Nippon Polyurethane Industry Co., Ltd.) was added and mixed therewith, and then filtered with a filter having an average diameter of 0.5 μm to produce a coating material for a back coat layer.

The thus-obtained coating materials for the non-magnetic layer, the magnetic layer, and the back coat layer were used to produce a magnetic recording medium as follows:
(Coating Process)

A polyamide substrate having a thickness of 4.5 μm was coated with the coating material for the non-magnetic layer from a nozzle so that the thickness after calendering was 1.4 μm. After the coated substrate was dried, it was calendered using a calendering device equipped with a plastic roll and a metal roll by passing it once through the nip at a temperature of 100° C., a linear load of 3500 N/cm, and a rate of 150 m/min. Further, the calendered substrate was irradiated with electron beams at 4.5 Mrad to form a non-magnetic layer thereon.

The non-magnetic layer was coated with the coating material for the magnetic layer from the nozzle so that the thickness after calendering was 0.15 μm. It was oriented by applying a magnetic field of 0.7 T and dried. Thereafter, it was calendered using the calendering device equipped with the plastic roll and the metal roll by passing it one through the nip at a temperature of 100° C., a linear load of 3500 N/cm, and a rate of 150 m/min to form a magnetic layer.

The magnetic layer was coated with the coating material for the back coat layer from the nozzle and dried so that the thickness after calendering was 0.5 μm. Thereafter, it was calendered using the calendering device equipped with the plastic roll and the metal roll by passing it one through the nip at a temperature of 80° C., a linear load of 3500 N/cm, and a rate of 150 m/min to form a back coat layer.

A web of a magnetic recording medium thus-prepared was left stand for 48 hours at 60° C. to be heat cured. Then, it was cut to a width of 3.8 mm, and incorporated into a DDS-4 mode cartridge to produce a magnetic recording medium (DDS-4 mode).

Examples 2 to 8

Magnetic recording media of EXAMPLES 2 to 8 were produced using a similar procedure to EXAMPLE 1 except that the abrasives used in the coating material for the back coat layer were changed as shown in Table 1.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Abrasive | TM-DR | TM-DR | TM-DR | TM-DAR | TM-DAR | TM-DAR | TM-DA | TM-DA |
| Average particle size of alumina (μm) | 0.23 | 0.23 | 0.23 | 0.15 | 0.15 | 0.15 | 0.20 | 0.20 |
| Alumina relative abrasivity | 95 | 95 | 95 | 55 | 55 | 55 | 75 | 75 |
| Alumina content (x) (pbw) | 0.20 | 0.50 | 1.00 | 0.55 | 1.00 | 1.45 | 1.00 | 0.78 |
| Abrasivity of back coat layer (y) (μm) | 13.1 | 14.4 | 16.8 | 13.1 | 15.0 | 16.8 | 15.6 | 14.8 |
| Results of surface inspection of magnetic layer | Good | Good | Good | Good | Good | Good | Good | Good |
| Results of surface inspection of back coat layer | Good | Good | Good | Good | Good | Good | Good | Good |

Comparative Examples 1 to 7

Magnetic recording media of COMPARATIVE EXAMPLES 1 to 7 were produced using a similar procedure to EXAMPLE 1 except that the abrasives used in the coating material for the back coat layer were changed as shown in Table 2.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Abrasive | none | TM-DAR | Conventional one | Conventional one | Conventional one | TM-DA | TM-DAR |
| Average particle size of alumina ($\mu$m) | — | 0.15 | 0.18 | 0.12 | 0.12 | 0.20 | 0.15 |
| Alumina relative abrasivity | — | 55 | 345 | 240 | 240 | 75 | 55 |
| Alumina content (x) (pbw) | 0 | 0.20 | 0.1 | 1.0 | 0.7 | 1.45 | 1.55 |
| Abrasivity of back coat layer (y)($\mu$m) | 12.0 | 12.3 | 13.2 | 19.8 | 16.8 | 18.2 | 17.1 |
| Results of surface inspection of magnetic layer | Good | Good | Good | Bad | Good | Bad | Bad |
| Results of surface inspection of back coat layer | Bad | Bad | Bad | Good | Bad | Good | Good |

The thus-prepared magnetic recording media in EXAMPLES 1 to 8 and COMPARATIVE EXAMPLES 1 to 7 were evaluated as follows for (1) abrasivity of the back coat layer and (2) surface inspection of the magnetic layer and the back coat layer after a durability test:

(1) Abrasivity of the Back Coat Layer

Figure 2:
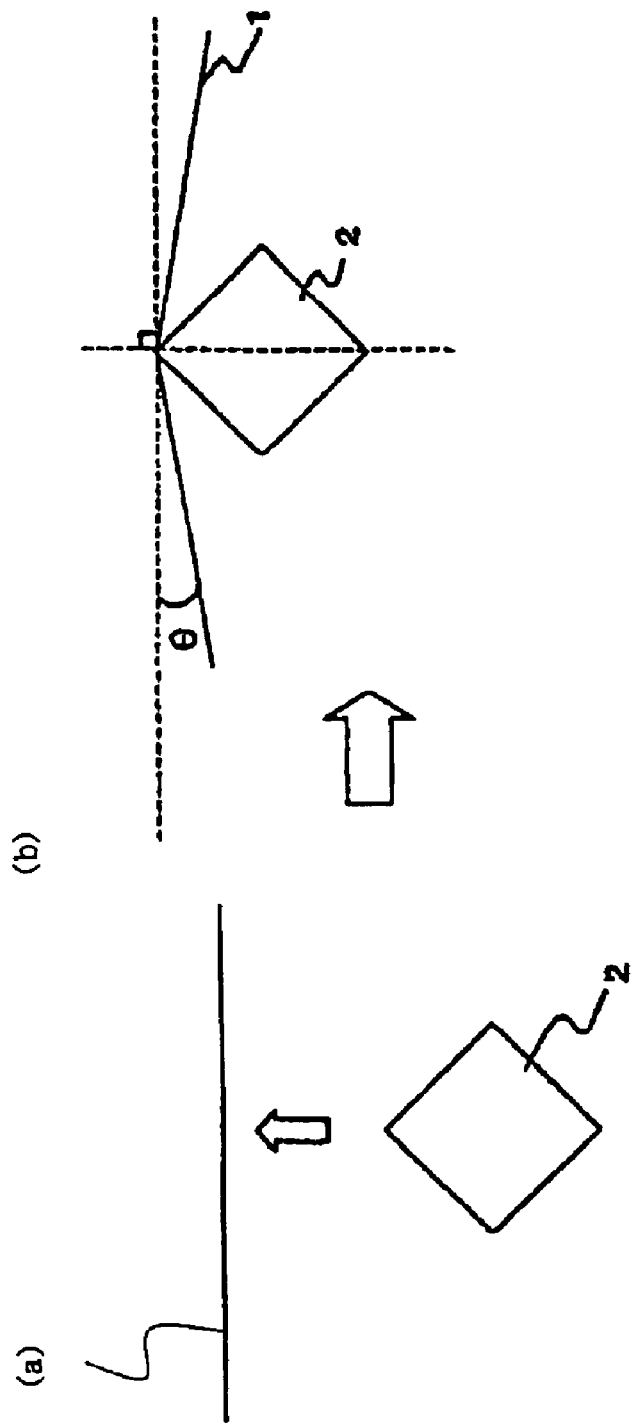
FIGS. 2A and 2B are sectional views for illustrating a method of measuring the abrasivity of the back coat layer according to an embodiment of the present invention.

FIG. 2 is a sectional view for illustrating a method of measuring the abrasivity of the back coat layer. As shown in FIG. 2A, a longitudinal direction of a prismatic Sendust bar 2 having a square cross-section was orthogonal to the running direction of the above-mentioned magnetic recording medium 1. Then, an edge of the Sendust bar 2 was pushed perpendiculary onto a surface of a back coat layer to the running direction of the magnetic recording medium 1, so that the magnetic recording medium 1 is pressed at an approaching angle θ of 12 degree, as shown in FIG. 2B. Then, a 50-m length of the magnetic recording medium 1, supported by a tension of 0.20 N/3.8 mm (0.526 N/cm per unit width), was moved back and forth at a running speed of 0.3 m/s. The Sendust bar 2 used was a prismatic Sendust bar (Fe—Si—Al alloy) having a square cross-section with a size of 6.0×6.0×25.0 mm, trade name "Block" made of SD-5 manufactured by Tokin Corp. The measurement was made at 25° C. under relative humidity of 50%.

Figure 3:
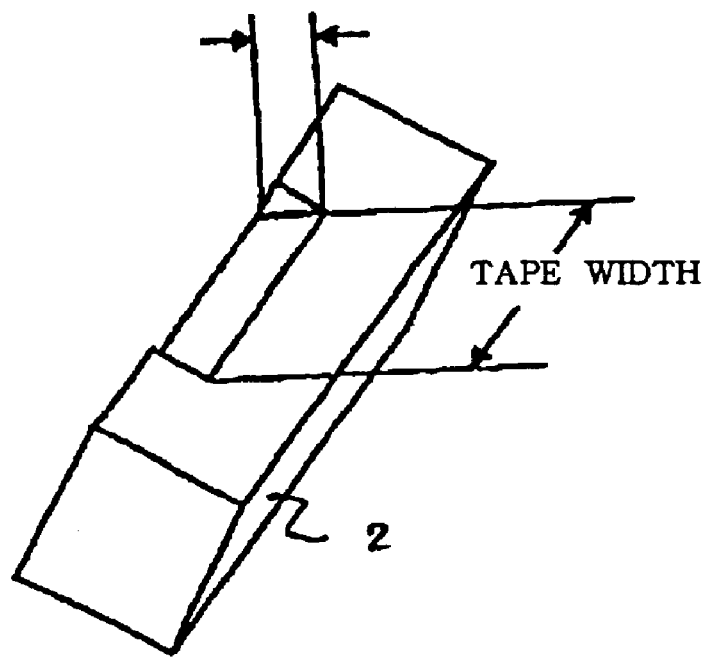
FIG. 3 is a perspective view of an abraded Sendust bar.

FIG. 3 is a perspective view of an abraded Sendust bar 2. As shown in FIG. 3, the edge of the Sendust bar 2 was scraped by contact with the magnetic recording medium 1. The width (y) ($\mu$m) of a surface formed by scraping in the running direction was measured ten times using a comparator (magnification of 800 times), and the values were averaged to determine the abrasivity of the back coat layer.

(2) Surface Observation of the Magnetic Layer and the Back Coat Layer After a Durability Test A durability test was conducted using a drive C1554A manufactured by IIP Co., Ltd. in a DDS-4 mode. Thirty two MB of random data were recorded to and read from a part of the magnetic recording medium. The recording and reading was repeated 2000 times.

After the durability test, 100 portions of both surfaces of the magnetic layer and the back coat layer that were wound in the roll in the cartridge many times were observed using a microscope at 400 times magnification in the running direction every 10 cm. The surface having no scrapes was evaluated as "Good", and the surface having scrapes was evaluated as "Bad".

Figure 4:
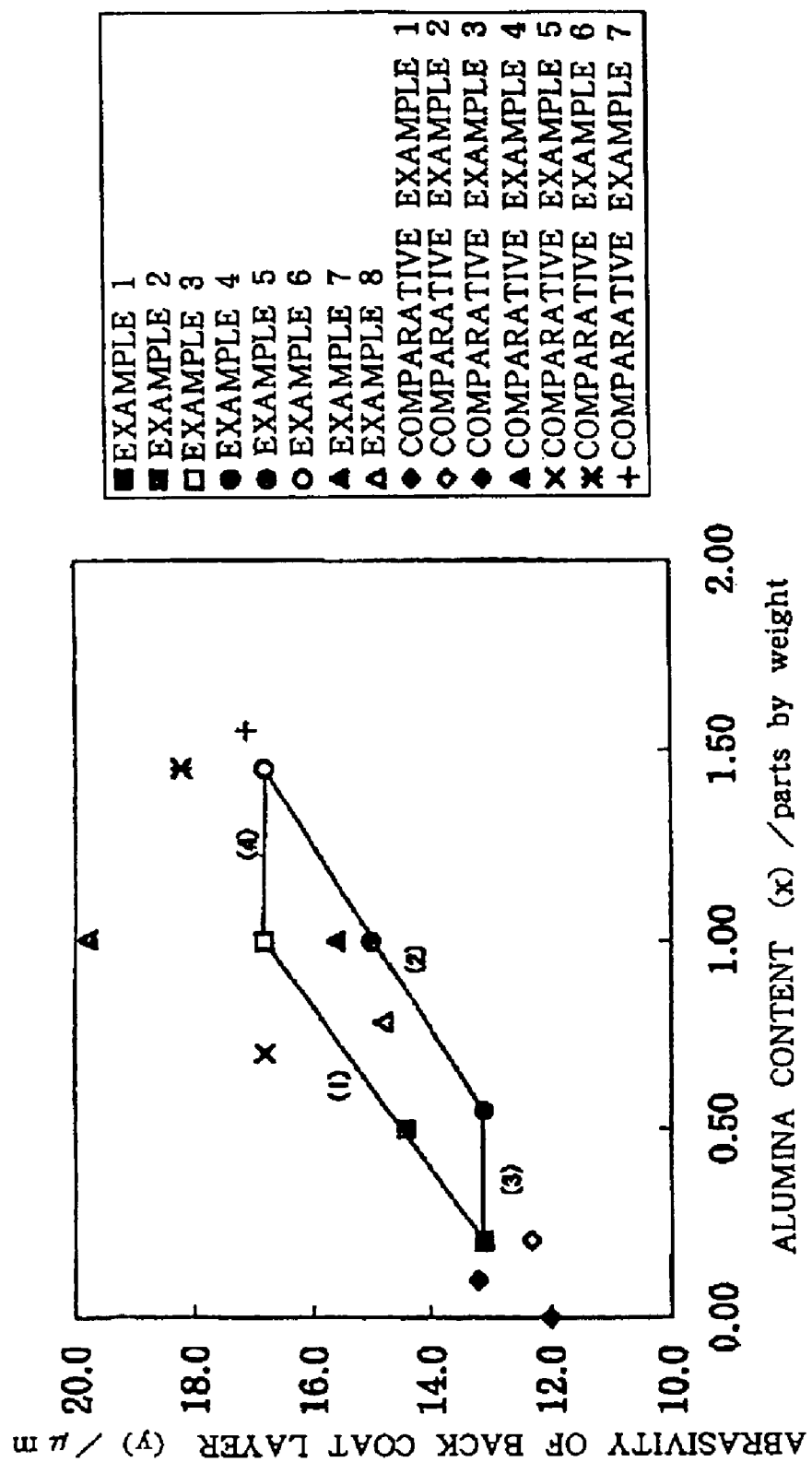
FIG. 4 is a graph of the equations (1) to (4) showing the relationship between the alumina content (x) and the abrasivity (y) of the back coat layer of examples and comparative examples.

FIG. 4 shows the relationship between the alumina content (x) and the abrasivity (y) of the back coat layer of the examples and comparative examples. As shown in Tables 1 and 2 and FIG. 4, the magnetic recording media of examples 1 to 8 had magnetic layers and back coat layer having no scrapes after the durability test, and thus had excellent durability. It is also shown that when the alumina content (x) and abrasivity (y) of the back coat layer were not within the range defined by the present invention, abrasion resistance and reinforcement of the back coat layer were insufficient, the back coat layer was damaged by the contact with the guide pins and the like, or the abrasivity of the back coat layer was too high, resulting in a damaged magnetic layer.

Although preferable embodiments of the magnetic recording medium according to the present invention are described while referring to the attached drawings, various modifications and alterations of this invention will become apparent to those skilled in the art without departing from the scope and intent of this invention, and it should be understood that this invention is not to be unduly limited to the illustrative embodiments set forth herein.

What is claimed is:

1. A magnetic recording medium, comprising:
    a non-magnetic substrate,
    a non-magnetic layer disposed on one surface of the non-magnetic substrate,
    a magnetic layer disposed on the non-magnetic layer, and
    a back coat layer disposed on the other surface of the non-magnetic substrate,
    wherein the back coat layer contains at least carbon black and alumina as non-magnetic powder, wherein the alumina has an average particle diameter of 0.15 to 0.23 $\mu$m, and wherein the alumina is in the form of particles having substantially spherical shape, and
    wherein the relation between the abrasivity (y) in microns of the back coat layer and the alumina content (x) parts by weight to 100 parts by weight of non-magnetic powder excluding alumina satisfies the following four equations:

$$y \leq 4.6x + 12.2 \quad (1)$$

$$y \geq 4.1x + 10.8 \quad (2)$$

$$y \geq 13 \tag{3}$$

$$y \leq 17 \tag{4}$$

where the abrasivity is measured as follows:

an edge of a prismatic Sendust bar having a square cross-section is pushed onto the surface of the back coat layer perpendiculary to the running direction of the magnetic recording medium, so that the longitudinal direction of the Sendust bar is orthogonal to the running direction of the magnetic recording medium, whereby the magnetic recording medium is pressed at an approaching angle of 12 degree; the magnetic recording medium is supported by a tension of 0.526 N/cm per unit width, and a 50-m length thereof is moved back and forth one time over the Sendust bar at a running speed of 0.3 m/s, whereby the width of the region scraped in the running direction on the Sendust bar by the surface of the back coat layer represents the abrasivity.

* * * * *